United States Patent [19]

Czabański

[11] 3,949,622

[45] Apr. 13, 1976

[54] SYSTEM FOR ELIMINATION OF CONSEQUENCES OF ANGULAR CLEARANCES IN DRIVING GEARS, ESPECIALLY FOR MACHINE TOOL DRIVING GEARS

[75] Inventor: Bolesław Czabański, Jarocin, Poland

[73] Assignee: Jarocinska Fabryka Obrabiarek Przedsiebiorstwo Panstwowe, Jarocin, Poland

[22] Filed: July 26, 1974

[21] Appl. No.: 492,973

[30] Foreign Application Priority Data
July 27, 1973  Poland........................ 164343

[52] U.S. Cl.............................. 74/409; 74/411.5
[51] Int. Cl.² ................... F16H 55/18; F16H 57/10
[58] Field of Search............................ 74/411.5, 409

[56] References Cited
UNITED STATES PATENTS
| | | | |
|---|---|---|---|
| 3,174,351 | 3/1965 | Spencer................ | 74/409 |
| 3,490,305 | 1/1970 | Dahlman et al. ............. | 74/409 |

Primary Examiner—Leonard H. Gerin
Attorney, Agent, or Firm—Haseltine, Lake & Waters

[57] ABSTRACT

A system for the elimination of consequences of angular clearances in driving gears, especially in machine tool driving gears consisting of a dynamic electromagnetically operated brake and of a power unit for exciting said brake. The brake has a rotor coupled without play with a spindle and constituted by the rotor of an asynchronous motor. The brake also has an exciter with double push-pull windings connected with a power unit. The power unit consists of a hand-adjusted direction current source supplying the main excitation winding, and a section generating a current which supplies the other excitation winding. The current supplying the additional excitation winding 10 is proportional to the current absorbed by the driving motor and to the current supplying the main excitation winding.

4 Claims, 1 Drawing Figure

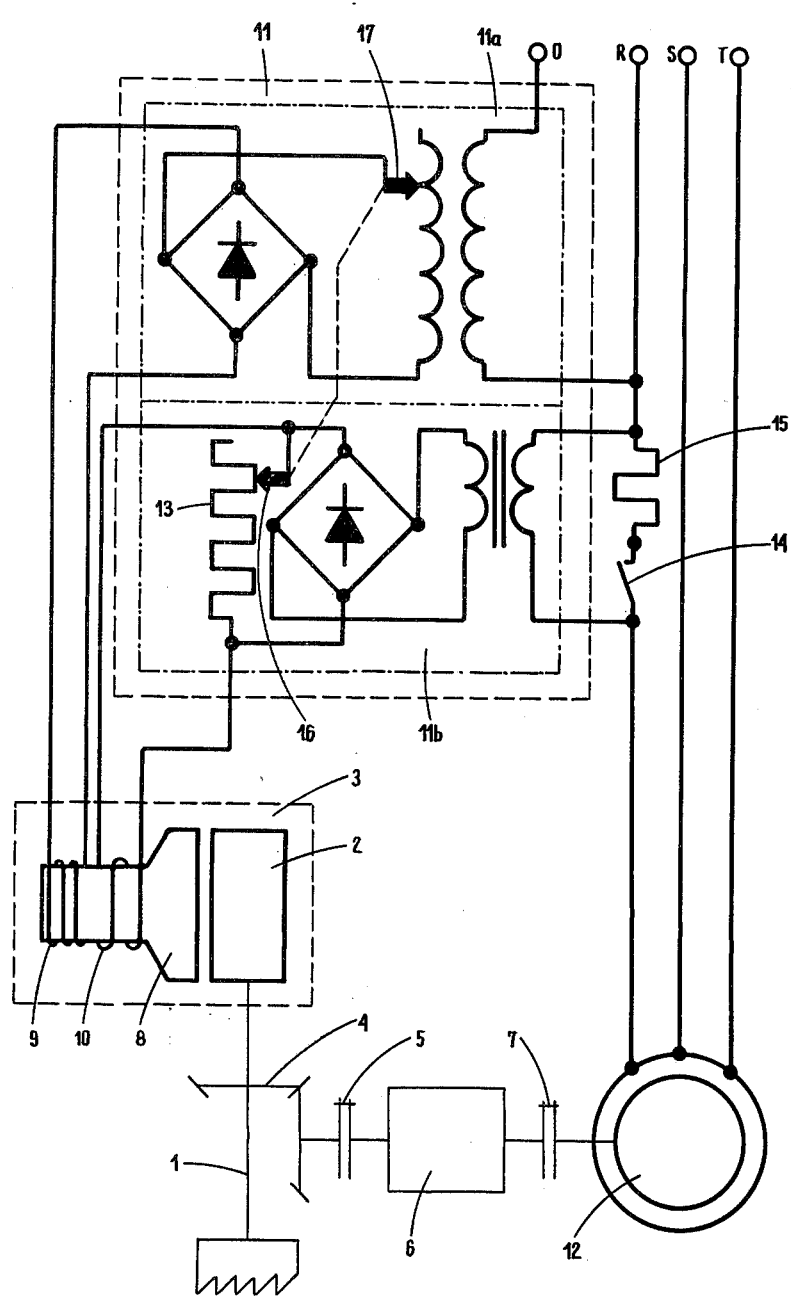

SYSTEM FOR ELIMINATION OF CONSEQUENCES OF ANGULAR CLEARANCES IN DRIVING GEARS, ESPECIALLY FOR MACHINE TOOL DRIVING GEARS

FIELD OF THE INVENTION

The invention relates to systems for elimination of the consequences of angular clearances in driving gears, especially in driving gears designed for machine tools.

BACKGROUND

No systems are known for the elimination of consequences of the angular clearances in driving gears, especially in those designed for machine tools.

In driving gears loaded with impact or impulse-type moments which appear distinctly, for example, in the milling of particularly narrow shapes with milling heads or face mills, the members of the kinematic chain transmitting the driving torque lose and recover in alternate cycles their mutual contact to this causes noisy operation, quick wear-and-tear of the parts, frequent total failure of the gear, and uneven peripheral velocity of the cutting tool. A non uniform speed of the milling spindle creates disadvantageous operation conditions of the cutting tool, causes quick wear of the cutting edges thereof, results in poor quality of the surface being machined, and increases the susceptibility of the machine tool to self-exciting torsional vibrations of the spindle.

SUMMARY OF THE INVENTION

An object of the invention is to provide smooth and vibration-free running of driving gears loaded by impact moments in course of operation.

The object of the invention is achieved through provision of a system consisting of an electromagnetically actuated brake, and of a power unit for supplying said brake. The brake is provided with a rotor coupled with a spindle without play, and in the form of a rotor of an asynchronous motor, and an exciter with a double exciting winding connected to a power unit. The power unit comprises an adjustable direct-current source to supply the main exciting winding, and a system for generating additional exciting current proportional to the current being consumed by the driving motor, and to the main exciting current.

The application of the system according to the invention brings substantial technical and economical profits. It eliminates undesirable effects of angular clearances in driving gears in a simple and effective way. Said gears run more silently, and the parts thereof are submitted to slower wear and to less frequent destruction.

The edges of the cutting tools work longer, and the surface being machined is of better quality. The system is simple and easy to service, dependable, and durable. Its operation is stable and independent of the environmental conditions, and does not require periodical checkings, adjustments, or regeneration. The system also makes use of the full power of the driving motor, as well adapts the motor for quick stopping of the machine spindle.

BRIEF DESCRIPTION OF DRAWING

The system according to the invention will be explained more particularly by way of an exemplary embodiment with reference to the sole FIGURE in the accompanying drawing.

The system operates in the following mode: To the end of the kinematic chain, which is in this case the spindle 1, the rotor 2 of the electromagnetic brake 3 is connected in play-free manner. The spindle 1 takes its drive from the members of the kinematic chain which is a source of angular clearances, and consisting for example of the bevel gear 4, the clutch 5, the multistage gearbox 6, and the clutch 7. The rotor 2 coupled with the spindle 1 rotates within a magnetic field generated by the exciter 8. The exciter 8 has a winding 9 generating the basic magnetomotive force in the magnetic circuit of the brake, and the winding 10 generating an additional magnetomotive force in the same magnetic circuit of the brake.

The winding 9 is supplied with hand-adjusted current from the section 11a of the power unit, the input of which is connected immediately to a supply line, the winding 10 however is supplied with current from the section 11b of the power unit, which is connected in series with one phase of the motor 12.

The resistor 13 in the section 11b of the power unit — due to its shunting effect, and due to the mechanical coupling of its controller 16 with the controller 17 adjusting the current supplying the main excitation winding — provides the component of the additional magnetomotive force to be proportional to the main magnetomotive force. The magnetomotive forces generated in the exciter 8 by the windings 9 and 10 are of opposite senses, and are chosen in such way that the resulting magnetomotive force reaches its zero value when the motor 12 reaches its rated load. Thus there is automatically provided a reduction of the spindle braking force as the usable torque load increases.

As in course of starting the motor 12, the additional magnetomotive force arising from the section 11b of the power unit would cause then unnecessary braking of the driving motor 12, the input circuit of said section is closed during the starting time by the contact 14 of the auxiliary relay via the resistor 15 which is chosen in such way that the electromotive forces arising from the windings 9 and 10 neutralize each other and the spindle is not being braked during the starting operation.

The system — without exceeding the scope of the invention — may be realized with smaller modifications consisting in replacing the push-pull excitation of the brake with a winding supplied from a manually adjustable transducor over one of its control inputs, and automatically over the other inputs with the current or the power taken over the driving motor, or probably with other parameters, as for example other spindle speed. The object of the invention is achieved by providing a system featuring dynamic braking of inductive operation as well as a power unit for actuation of the associated brake. Roter 2 of the brake 3 is coupled without play with the last member of the kinematic chain for driving the spindle of the machine tool, e.g. spindle 1. The excitation winding consists of two independent parts 9 and 10. The said windings are supplied by the power unit in such a manner that electromotive forces generated by these windings tend to neutralize each other.

What is claimed is:

1. A system for elimination of the consequences of angular clearances in driving gears having a kinematic chain member adapted for being braked, said system comprising an electromagnetic brake for said driving gears, said brake being an inductively operated dynamic brake, said brake including exciter means coupled to the power means and including windings supplied by the power means and automatically controlling the excitation of said brake according to conditions of work of the driving gears.

2. A system as claimed in claim 1 wherein the kinematic chain includes a driving motor and the power means comprises a supply line, a hand-adjustable direct-current source connected directly with the supply line and supplying one of the windings and an alternating current transducer supplied by the supply line and coupled to the driving motor and to another of said windings.

3. A system as claimed in claim 2 comprising a resistor, an alternating current transducer shunted by said resistor and including a controller mechanically coupled with said direct-current source for controlling said one winding.

4. A system as claimed in claim 3 wherein said brake includes a rotor constituted by the rotor of an asynchronous motor.

* * * * *